(12) United States Patent
Petit

(10) Patent No.: US 6,418,582 B1
(45) Date of Patent: Jul. 16, 2002

(54) BELLOWS AND CORRIDOR FOR ACCESS TO AIRPLANES

(75) Inventor: Jean-Claude Petit, Mouvaux (FR)

(73) Assignee: Le Joint Francais S.N.C., Paris (FR)

(*) Notice: Subject to any disclaimer, the term of this patent is extended or adjusted under 35 U.S.C. 154(b) by 0 days.

(21) Appl. No.: 08/780,854

(22) Filed: Jan. 9, 1997

(30) Foreign Application Priority Data

Jan. 19, 1996 (FR) .............................. 96 00607

(51) Int. Cl.$^7$ ................................. E01D 1/00
(52) U.S. Cl. ..................................... 14/71.5
(58) Field of Search .............. 14/69.5, 71.5; 52/173.2

(56) References Cited

U.S. PATENT DOCUMENTS

| | | | |
|---|---|---|---|
| 3,639,934 A | * | 2/1972 | Eggert, Jr. .................. 14/71.5 |
| 3,644,952 A | * | 2/1972 | Hatch ......................... 14/71.5 |
| 3,816,867 A | | 6/1974 | Shirzad et al. |
| 4,112,958 A | * | 9/1978 | Anderberg ............... 14/71.5 X |
| 4,120,067 A | * | 10/1978 | Hone et al. ................... 14/71.5 |
| 4,712,339 A | * | 12/1987 | Wenham et al. ......... 14/71.5 X |
| 5,267,368 A | * | 12/1993 | Saunders ..................... 14/71.5 |

FOREIGN PATENT DOCUMENTS

| | | |
|---|---|---|
| EP | 205314 | 12/1986 |
| FR | 2407089 | 5/1979 |

* cited by examiner

Primary Examiner—Thomas B. Will
Assistant Examiner—Kristine M. Markovich
(74) Attorney, Agent, or Firm—Alston & Bird LLP

(57) ABSTRACT

A bellows for an airplane boarding corridor for passengers, and a corridor including such bellows. A bellows actuator device of the invention has chambers that can be inflated and deflated on command to enable the bellows to be extended and to allow the bellows to be retracted, and it also returns the bellows to the retracted condition. Advantageously, the inflatable chambers of the actuator device of the invention form at least two rows of tubes disposed symmetrically or substantially symmetrically about a longitudinal plane of symmetry of the bellows, each row being individually inflatable. The present invention is mainly applicable to making equipment, in particular weatherproofing bellows, for airport boarding corridors for passengers.

10 Claims, 3 Drawing Sheets

BELLOWS AND CORRIDOR FOR ACCESS TO AIRPLANES

The invention relates to a bellows for an airplane boarding corridor for passengers, and to a corridor including such bellows.

BACKGROUND OF THE INVENTION

Airplane boarding corridors for passengers are known that include a concertina bellows at one end of the corridor proper for application against the airplane fuselage around an access door of the airplane to protect passengers from the weather. Bellows for such corridors are described, for example, in NL-A-84 00266, DE-A1-3 023 885, FR-2 419 860, FR-2 521 950 or FR-2 525 556. Amongst the devices described in those documents, in order to extend and retract the bellows, some (NL-8400266 or FR-2 521 950) make use of winches with cables or belts, while others (FR-2 525 556) are actuated by hydraulic actuators which are associated with gas springs. The use of such cable or belt winches is, however, not without difficulty due to the tension in the cables or to the fact that they can become tangled, whereas devices using hydraulic actuators and gas springs can be subject to leaks, and they also press the sealing collar of the bellows against the fuselage of the airplane in non-uniform manner.

FR-2 672 267 describes a weatherproofing bellows that includes two independent actuator mechanisms, each including a linkage having a head coupled to the rod of an actuator whose cylinder can be adjustably inclined relative to the frame of the corridor.

Also, patent U.S. Pat. No. 4,333,195 describes a bellows for an airplane boarding corridor for passengers that is designed to be extended under the action of springs in the event of a fire and to surround the weatherproofing bellows. The mechanism for extending the bellows includes linkages whose branches are hinged to the frame. Since it has no drive means, the bellows of patent U.S. Pat. No. 4,333,195 cannot be used as bellows for weatherproofing, since such bellows need to be operated frequently.

Actuator devices of known types are complex and consequently difficult to manufacture and to keep in proper working order.

Thus, there exists a problem of providing weatherproofing bellows on airplane boarding corridors for passengers in association with an actuator device for such bellows that does not present the drawbacks of known devices.

OBJECTS AND SUMMARY OF THE INVENTION

Consequently, a general object of the invention is to provide a solution to this problem and in particular to provide an actuator device enabling a bellows of an airplane boarding corridor for passengers that can be adapted to the shapes of the various airplanes in existing fleets.

Another object of the invention is to provide a bellows whose actuator device constitutes a system that is simple, reliable, and easy to control both when extending and when retracting the bellows.

Another object of the invention is to provide such bellows and/or actuator device suitable for original installation on an airport boarding corridor, or else suitable for retrofitting to replace a portion of an assembly that is already installed.

Another object of the invention is to provide such bellows and actuator mechanism that ensure good sealing of the end collar of the bellows against the fuselage of the airplane to which it is to co-operate.

Another object of the invention is to provide such bellows and actuator system that are lightweight, easy to maintain, do not have any wear pieces, and which also continue to operate uniformly over time, in particular independently of temperature variations.

The invention achieves these objects by a bellows-actuating device that includes chambers which are inflatable (to extend the bellows) and deflatable (to allow the bellows to retract) on command, together with return means for urging the bellows towards the retracted condition. Advantageously, the inflatable chambers of the actuator device of the invention form at least two rows of tubes disposed symmetrically or substantially symmetrically about the longitudinal plane of symmetry of the bellows, each row being independently inflatable.

The invention mainly provides a weatherproofing bellows for an airplane boarding corridor for passengers, the bellows comprising a flexible tunnel-forming envelope, a resilient collar, and an actuator device for deploying the bellows to press the collar around an access door in the fuselage of an airplane, wherein the actuator device comprises chambers that are inflatable on command and that are secured to the flexible envelope to deploy the bellows.

The invention also provides a bellows, wherein the inflatable chambers are secured to the outside face of the tunnel-forming envelope, so as to avoid occupying space inside the bellows.

The invention also provides a bellows, wherein the inflatable chambers are in the form of elongate tubes and extend transversely relative to the axis of the bellows.

The invention also provides a bellows, including two pneumatic actuator devices disposed symmetrically about a longitudinal midplane of the bellows, each pneumatic actuator device comprising a row of tubes that are short relative to the width of the bellows.

The invention also provides a bellows, wherein the inflatable chambers are disposed on the roof of the bellows.

The invention also provides a bellows, including reinforcing members, and wherein successive reinforcing members are connected together at each pneumatic actuator device by pairs of small-section tubes.

The invention also provides a bellows, including compressed air feed for the inflatable chambers and means for limiting the pressure in the inflatable chambers so as to limit the force with which the collar presses against the fuselage of the airplane to a reference value.

The invention also provides a bellows, including return means for returning the bellows to the folded condition, the return means comprising counterweights connected by straps or cables to the collar.

The invention also provides a bellows, including a frame having tubular uprights for fixing to a corridor, the counterweights of the return means being mounted to move in translation in said tubular uprights.

The invention also provides an airplane boarding corridor for passengers including a bellows of the invention.

BRIEF DESCRIPTION OF THE DRAWINGS

The invention will be well understood from the following description given by way of example and made with reference to the accompanying drawings, in which:

In FIGS. 1 to 3, the same references are used to designate the same elements.

MORE DETAILED DESCRIPTION

Figure 1:
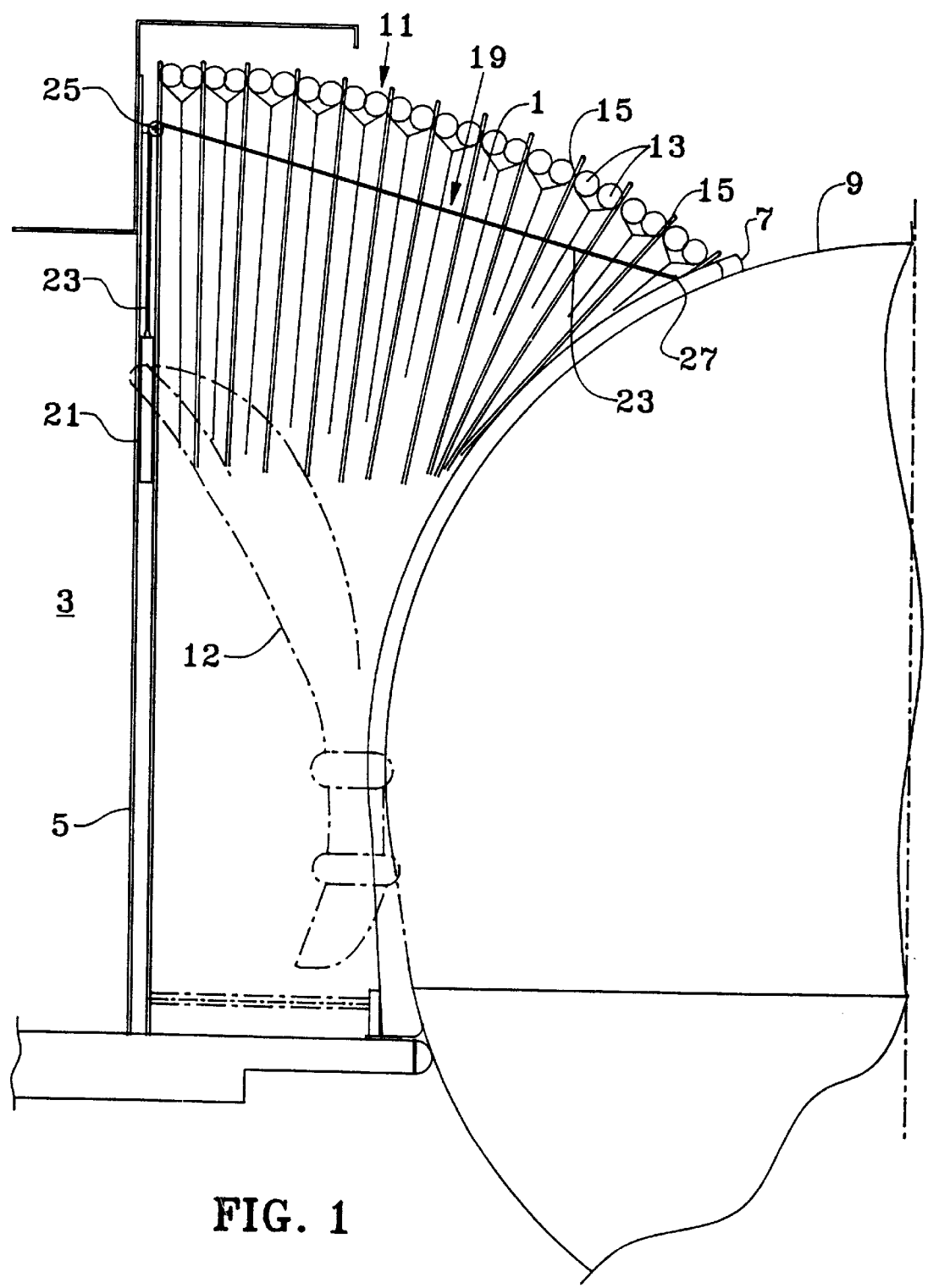
FIG. 1 is a longitudinal section I—I of the preferred embodiment of a bellows including an actuator device of the present invention.
Figure 3:
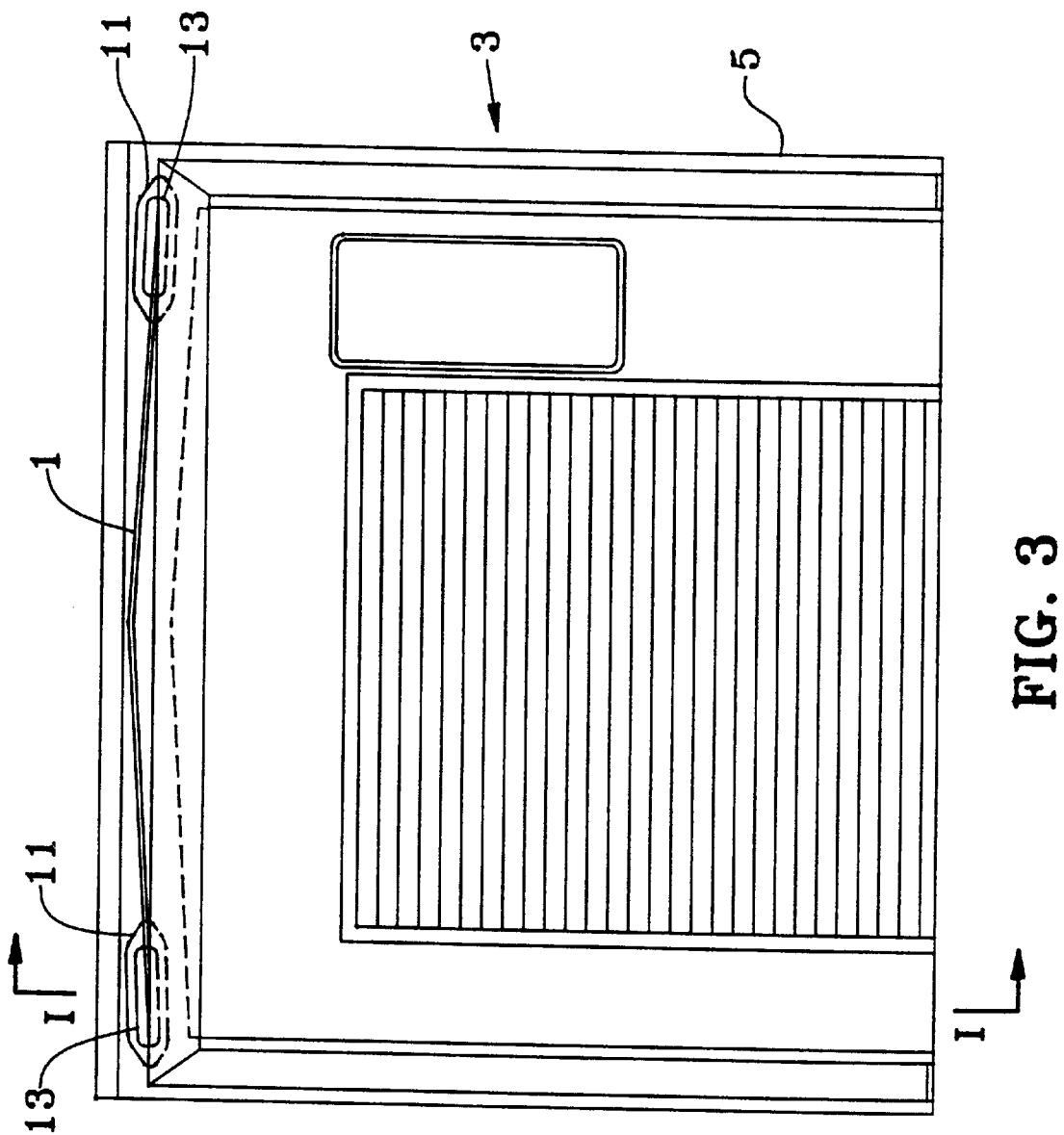
FIG. 3 is an end view from the outside of a corridor fitted with a bellows of the present invention.

In FIG. 1, there can be seen a bellows 1 constituted like the bellows of a concertina, forming the front portion of a rigid corridor 3 whose end can be seen in FIG. 3. The rear end of the bellows 1 penetrates a little into the tunnel of the corridor and is fixed thereto via a peripheral frame 5. In conventional manner, the bellows is made of rubberized cloth or the like, and it is provided at its front end with a sealing collar 7 known in this art as a "bumper" which is made of flexible material that is elastically deformable so as to avoid damaging the fuselage 9 of the airplane with which it co-operates when the bellows 1 is in its deployed condition.

Advantageously, the pneumatic actuator device 11 has chambers that are inflatable at low pressure, e.g. lying in the range 0.06 MPa to 0.15 MPa, having an envelope of rubber or the like. In the preferred embodiment, the chambers 13 are disposed outside the tunnel formed by the bellows 1 so as to avoid occupying space that can be used by passengers boarding an airplane, and that can also be used for opening the door 12 of the airplane. Nevertheless, the pneumatic actuator device 11 could naturally be embodied so that chambers 13 are inside the bellows 1, occupying some of the inside space thereof, and that would not go beyond the ambit of the present invention. Advantageously, the chambers 13 are disposed between reinforcing members 15 of the bellows 1. Advantageously, the inflatable chambers comprise a succession of elongate tubes disposed transversely relative to the tunnel formed by the bellows 1 in its deployed condition.

Figure 2:
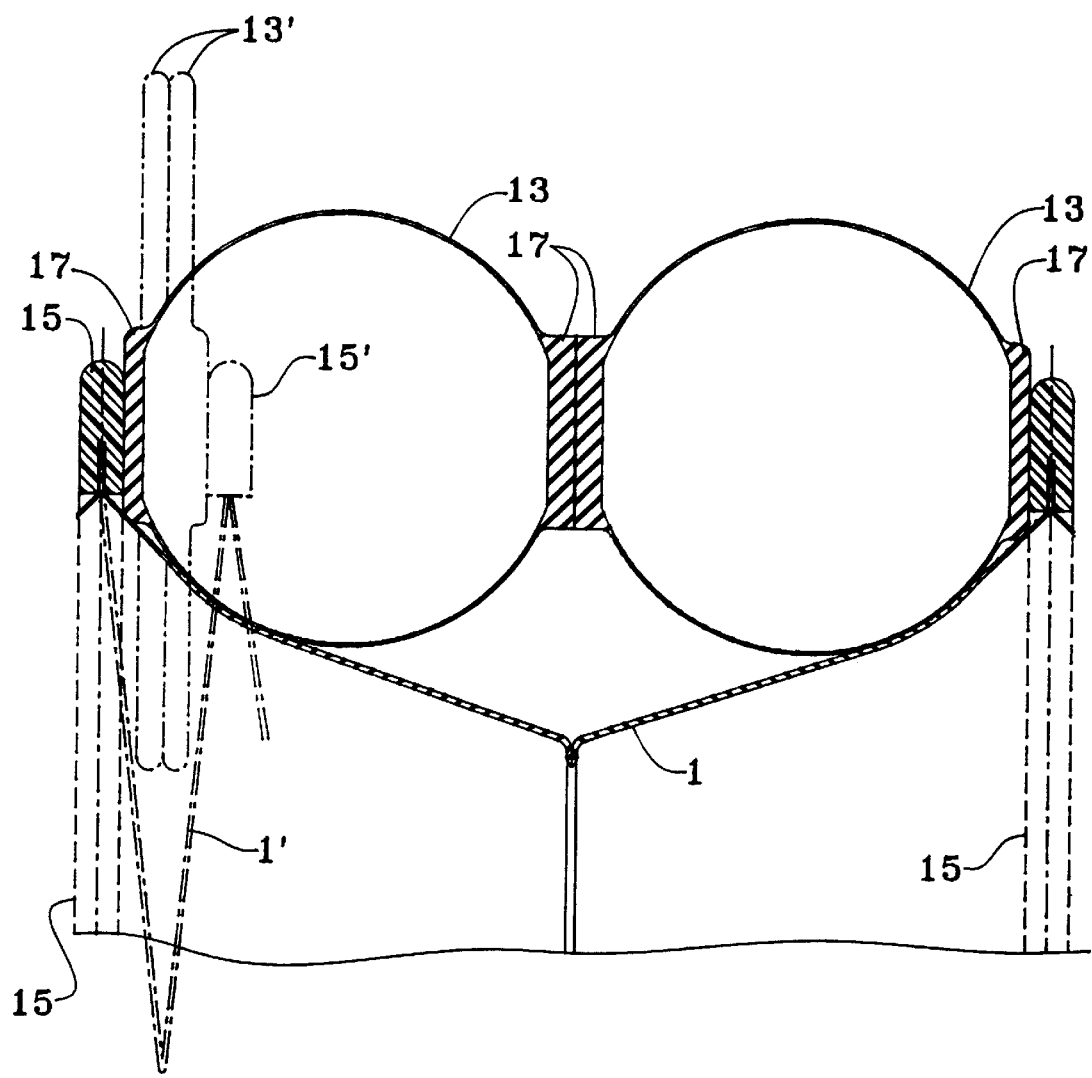
FIG. 2 is a section view on a larger scale of two inflatable chambers implemented in the actuator device of FIG. 1.

In the preferred example shown in FIG. 2, two tubes are disposed between each pair of reinforcing members 15 so that when the bellows is in its deployed condition each tube is substantially circular in section and is provided with two solid fixing stubs 17 of rectangular section. A first stub 17 of each tube 30 is connected to one side of a reinforcing member 15 of the bellows 1, while the opposite stub is assembled to the facing stub of the adjacent tube. When the bellows is in its folded condition, referenced 1' and shown in chain-dotted lines in FIG. 2, the tubes 13' are flattened and enable the successive reinforcing members 15' to be moved closer together. Short and medium length bellows are advantageously actuated by two pneumatic actuator devices 11, each having elongate tubes 13 of length that is short relative to the width of the bellows 1 and disposed, as shown in FIG. 3, symmetrically about a longitudinal midplane of the bellows, on the roof thereof. Advantageously, the chambers 13 of the two pneumatic actuator devices 11 have the configuration shown in FIG. 2. Each tube 13 advantageously has a diameter lying in the range 70 mm to 120 mm and a length lying in the range 150 mm to 300 mm. By using independent control means for the two pneumatic actuator devices 11, it is possible to deploy the bellows symmetrically about its longitudinal central axis so as to enable the collar 7 to match the shape of the airplane fuselage around a door situated in a portion of said fuselage 9 that is constant in section, or to extend the bellows 1 asymmetrically relative to its longitudinal midplane so as to match the profile of the fuselage 9 around doors that are disposed in regions where the diameter of the fuselage 9 varies, in particular at the front or the back of the airplane.

In a variant of this example, when the gap between two corrugations of the bellows is greater than 240 mm, the pneumatic drive system may be constituted by a multichamber element that is fixed between the reinforcing members 15 of the bellows 1.

For bellows of great length, e.g. greater than 5 meters (m), it may be advantageous to provide the bellows 1 with one or more additional pneumatic actuator devices 11 running parallel to the device 11 shown in FIG. 3.

The bellows 1 of the present invention is advantageously fitted with means 19 for returning it to the folded condition. In the advantageous example shown in FIG. 1, the return means 19 comprise counterweights 21 on either side of the bellows 1 and advantageously received in the frame 5 which is hollow, e.g. tubular, each counterweight being connected by a strap or cable 23 passing over a pulley 25 to anchor points 27 disposed on the collar 7. Advantageously, the pulley 25 is made of metal, in particular brass, or it is made of plastic, in particular the plastics material sold by Dupont de Nemours under the trademark Nylon. The pulley is advantageously provided with a system for preventing the cable 23 from escaping and the frame 5 includes an inspection hatch that can optionally be used for maintaining the counterweight 21. Advantageously, the counterweight 21 has a sheath with a low coefficient of friction, e.g. a polyethylene sheath, enabling it to slide silently in the uprights of the frame 5.

The mass of the counterweights 21 is sufficient for them to be capable of folding the bellows 1 under their own weight in the absence of pressure in the chamber 13, while the chambers 13 are being deflated, but not so great as to prevent the bellows 1 from being extended when operating pressure is applied.

The apparatus of the present invention also includes a source of fluid under pressure, e.g. compressed air, connected by a pipe, preferably to an expander associated with each pneumatic actuator device 11. Advantageously, the pressure limiter limits the force with which the collar 7 is pressed against the fuselage 9 of the airplane.

The operation of the device of the invention can be seen immediately from the above description.

When in the rest condition, the bellows 1 is folded against the corridor 3 and its chambers 13 have no pressure and are flattened so that the reinforcing members 15 are relatively close together, defining a corrugation apex angle that is small in value.

When the bellows 1 is to be brought into contact with the fuselage 9 of the airplane, an operator activates an extender control device, e.g. by pressing a button marked out on the corridor control panel, to cause fluid under pressure to be fed to the pneumatic actuator devices 11, causing the chambers 13 to inflate, thereby simultaneously extending both sides of the bellows and causing the entire assembly to be extended as shown in FIG. 2, i.e. so that the corrugation apex angle becomes relatively large, with this continuing until contact is established between the collar 7 and the fuselage 9 of the airplane.

As soon as the collar 7 associated with one of the side faces of the bellows 1 comes into contact with the airplane, a pressure limiter or pressostat associated with delivering air under pressure stops the air feed and thus stops the system, while the other side of the bellows continues to move until it too comes into contact with said fuselage. The out button is then released and the bellows 1 is held in place against the airplane with the collar 7 in the position shown in FIG. 2. The bellows 1 is held in the deployed position by maintaining the pressure in the chambers 13 of both pneumatic actuator devices 11. The bellows 1 is folded up by releasing the pressure in the chambers 13 of the pneumatic actuator devices 11, e.g. by means of a control button marked in on the control panel of the corridor. The chambers 13 connected to atmospheric pressure no longer oppose the action of the counterweights 21 which return the bellows 1 to the folded condition (to the left in FIG. 1).

The assembly as described above is made in the form of a self-contained unit suitable for being associated with any airplane access corridor, independently of the structure thereof, thus enabling it to be fitted to such a corridor during original manufacture, or to be retrofitted to replace an existing device.

The device of the present invention does not contain any mechanical elements and is very reliable and extremely simple to maintain. If necessary, the pneumatic actuator devices 11 and in particular the chambers 13 can be installed and reinstalled extremely quickly. The pneumatic actuator devices 11 in the preferred embodiment of the device of the present invention do not take up useful space inside the bellows and run no risk of impeding opening or closing the airplane door. In addition, the system of the present invention has the advantage of exerting constant and uniform force on the fuselage 9 of the airplane, regardless of the type and shape thereof.

The present invention is mainly applicable to making equipment, in particular weatherproofing bellows, for airport boarding corridors for passengers.

What is claimed is:

1. A weatherproofing bellows for an airplane boarding corridor for passengers, the bellows comprising a flexible tunnel-forming envelope, a resilient collar, and an actuator for deploying the bellows to press the collar around an access door in the fuselage of an airplane, wherein the actuator comprises at least two pneumatic activator devices each having chambers that are inflatable on command and that are secured to the flexible envelope to deploy the bellows, the pneumatic actuator devices being disposed symmetrically about a longitudinal midplane of the bellows and each pneumatic actuator device comprising a row of tubes that are short relative to the width of the bellows.

2. A bellows according to claim 1, wherein the inflatable chambers are secured to an outside face of the tunnel-forming envelope, so as to avoid occupying space inside the bellows.

3. A bellows according to claim 1, wherein the inflatable chambers are in the form of elongate tubes and extend transversely relative to the axis of the bellows.

4. A bellows according to claim 3, including reinforcing members, and wherein successive reinforcing members are connected together at each pneumatic actuator device by pairs of small section tubes.

5. A bellows according to claim 1, wherein the tunnel-forming envelope defines a roof of the bellows, and the inflatable chambers are disposed on the roof of the bellows.

6. A bellows according to claim 1, including compressed air feed for the inflatable chambers and means for limiting the pressure in the inflatable chambers so as to limit the force with which the collar presses against the fuselage of the airplane to a reference value.

7. A bellows according to claim 1, including return means for returning the bellows to the folded condition, the return means comprising counterweights connected by straps or cables to the collar.

8. A bellows according to claim 7, including a frame having tubular uprights for fixing to a corridor, the counterweights of the return means being mounted to move in translation in said tubular uprights.

9. An airplane boarding corridor for passengers, including a bellows according to claim 1.

10. A weatherproof bellows for an airplane boarding corridor for passengers, the bellows comprising a flexible tunnel-forming envelope, a resilient collar, an actuator for deploying the bellows to press the collar around an access door in the fuselage of an airplane, wherein the actuator comprises chambers that are inflatable on command and that are secured to the flexible envelope to deploy the bellows, a frame having tubular uprights for fixing the bellows to a corridor, and return means for returning the bellows to the folded condition, the return means comprising counterweights connected by straps or cables to the collar and being mounted to move in translation in said tubular uprights.

\* \* \* \* \*